P. JOTTER.
Furrowing Machine.
No. 133,537.
Patented Dec. 3, 1872.
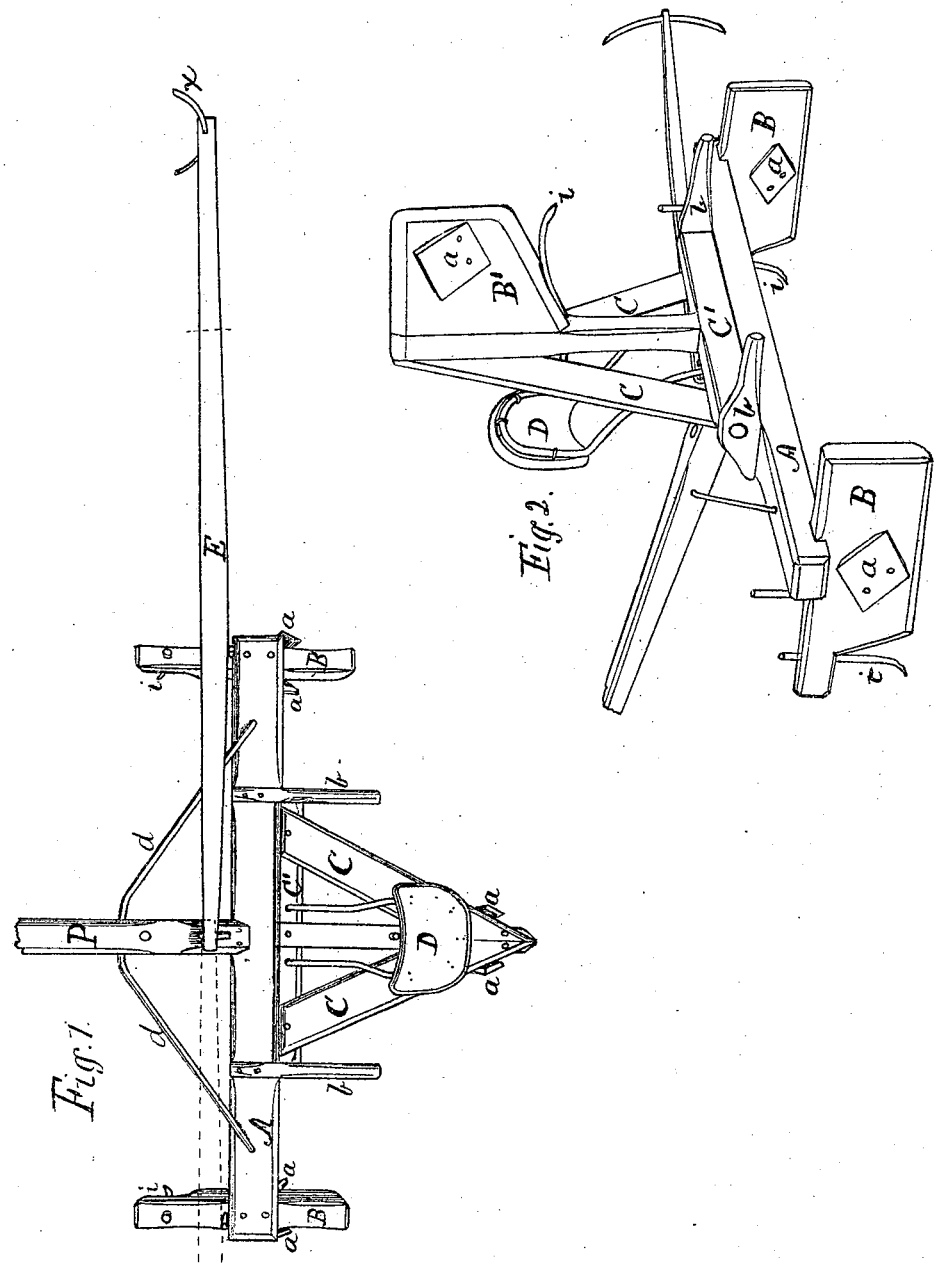
Witnesses—
William Jotter
J. P. K. Peck
Peter Jotter
Inventor
H. P. K. Peck
Attorney

UNITED STATES PATENT OFFICE.

PETER JOTTER, OF MONROE, OHIO.

IMPROVEMENT IN FURROWING-MACHINES.

Specification forming part of Letters Patent No. 133,537, dated December 3, 1872.

*To all whom it may concern:*

Be it known that I, PETER JOTTER, of Monroe, in the county of Butler and State of Ohio, have invented a new and useful Improvement in Furrowing-Machines; and I do hereby declare that the following is a full and exact description thereof, reference being had to the accompanying drawing and to the letters of reference marked thereon.

Figure 1 represents a plan or top view of my machine. Fig. 2 represents a perspective view of the same with the hinged central furrower elevated.

The object of my improved furrower is to prepare plowed land for planting corn or other seeds in rows by furrowing it out in the usual manner. This work has been generally done by the use of small plows, and sometimes two or three runners secured to a beam have been employed like an ordinary sled to furrow out or mark off the land. My improvement consists in the combination of two fixed runners with a central hinged runner (each of which is provided with an opener or cultivator-tooth,) and with other devices, as hereinafter described.

The main frame of my furrower consists of the timber A seated upon and bolted to the runners B, upon the sides of which wings $a$ are secured to force away the earth laterally as the machine progresses. Upon the frame-piece A handles $b\ b$ are secured, which are provided with holes for the journals of the hinged frame C C', to which the central runner B' is attached. A driver's seat D is supported upon the central hinged frame C, and the tongue P is fastened to frame-piece A and sustained by two braces, $d\ d$. A detachable marker, E, is connected by one end to a fixed hook at the rear end of the tongue P, and it may be reversed in position so as to project out at either side of the furrowing-machine, as indicated in dotted lines in Fig. 1. The marker is furnished with the curved rod X, which will mark upon the ground the line for the team to follow at each successive crossing of the field being furrowed. The central runner B' fastened to the hinged frame C will rise and fall in passing over undulating ground, and permit the two end runners B to rest upon the ground under all the varying conditions thereof when the machine is in use. The handles $b\ b$ are for the purpose of setting the machine in proper position at starting. In front of each furrower a cultivator-tooth, $i$, is placed to open its way and to loosen up the ground for the seeds to be planted.

Having described my invention, I claim and desire to secure by Letters Patent—

The central hinged frame C C' with its seat D and furrower B', in combination with frame-piece A and the outer furrowers B, arranged substantially as and for the purposes specified.

In witness hereof I have hereunto set my hand this 29th day of May, A. D. 1872.

PETER JOTTER.

Witnesses:
H. P. K. PECK,
R. B. DAVIDSON.